United States Patent [19]

Mellgren

[11] Patent Number: 4,872,700

[45] Date of Patent: Oct. 10, 1989

[54] SELF-PROPELLED VEHICLE HAVING BOGIE-TYPE RUNNING GEAR

[75] Inventor: Per-Gustaf Mellgren, Kirkland, Canada

[73] Assignee: Forest Engineering Research Institute of Canada, Pointe Claire, Canada

[21] Appl. No.: 234,747

[22] Filed: Aug. 22, 1988

[30] Foreign Application Priority Data

Jan. 26, 1988 [CA] Canada ................................. 557369

[51] Int. Cl.4 ........................................... B60G 19/02
[52] U.S. Cl. ..................................... 280/677; 280/682
[58] Field of Search ............... 280/104, 677, 678, 679, 280/680, 681, 682, 611; 180/41

[56] References Cited

U.S. PATENT DOCUMENTS

| | | | |
|---|---|---|---|
| 3,313,555 | 4/1967 | Reimer | 280/104 |
| 3,504,928 | 4/1970 | Reimer | 280/104 |
| 3,917,306 | 11/1975 | Madler et.al. | 280/104 |
| 4,324,304 | 4/1982 | Hashimoto et al. | 180/9.52 |

FOREIGN PATENT DOCUMENTS

| | | | |
|---|---|---|---|
| 1157931 | 11/1963 | Fed. Rep. of Germany | 280/677 |
| 2256934 | 5/1973 | Fed. Rep. of Germany | 280/677 |

Primary Examiner—Kenneth R. Rice
Attorney, Agent, or Firm—Charles E. Brown; Charles A. Brown

[57] ABSTRACT

A common carrier for a feller-buncher, forwarder, or skidder comprising a self-propelled vehicle including a chassis and a bogie on either side of the chassis. The bogie includes a walking beam with pneumatic wheels on either end of the walking beam. A first arm extends upwardly from the walking beam and is connected by links to a rocking beam mounted in a horizontal plane on the top of the chassis and pivoting about a vertical axis. The rocking beam is mounted on a sliding pad adapted to slide in a track along a longitudinal axis of the chassis. Hydraulic piston and cylinder means are provided for giving a limited longitudinal adjustment or displacement to the mounting pad.

6 Claims, 4 Drawing Sheets

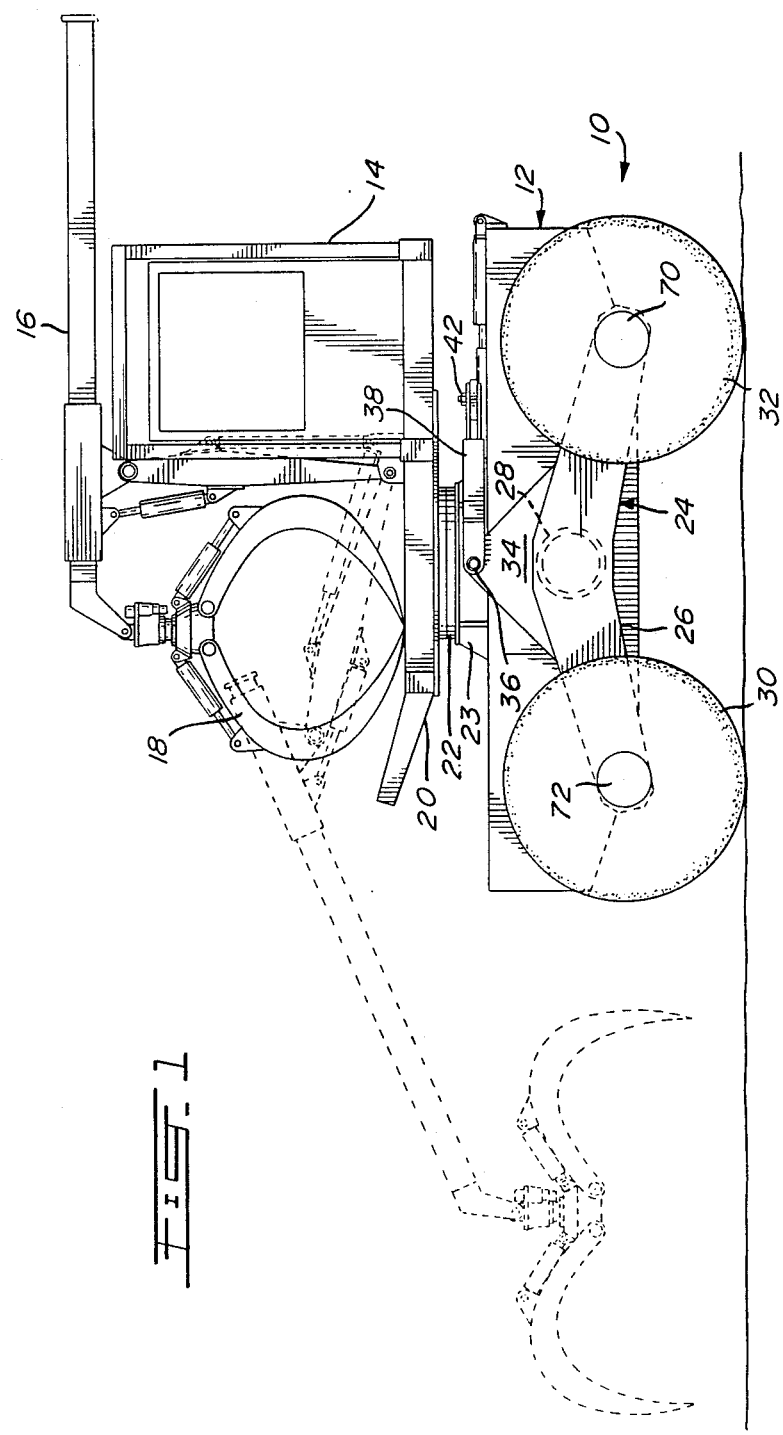

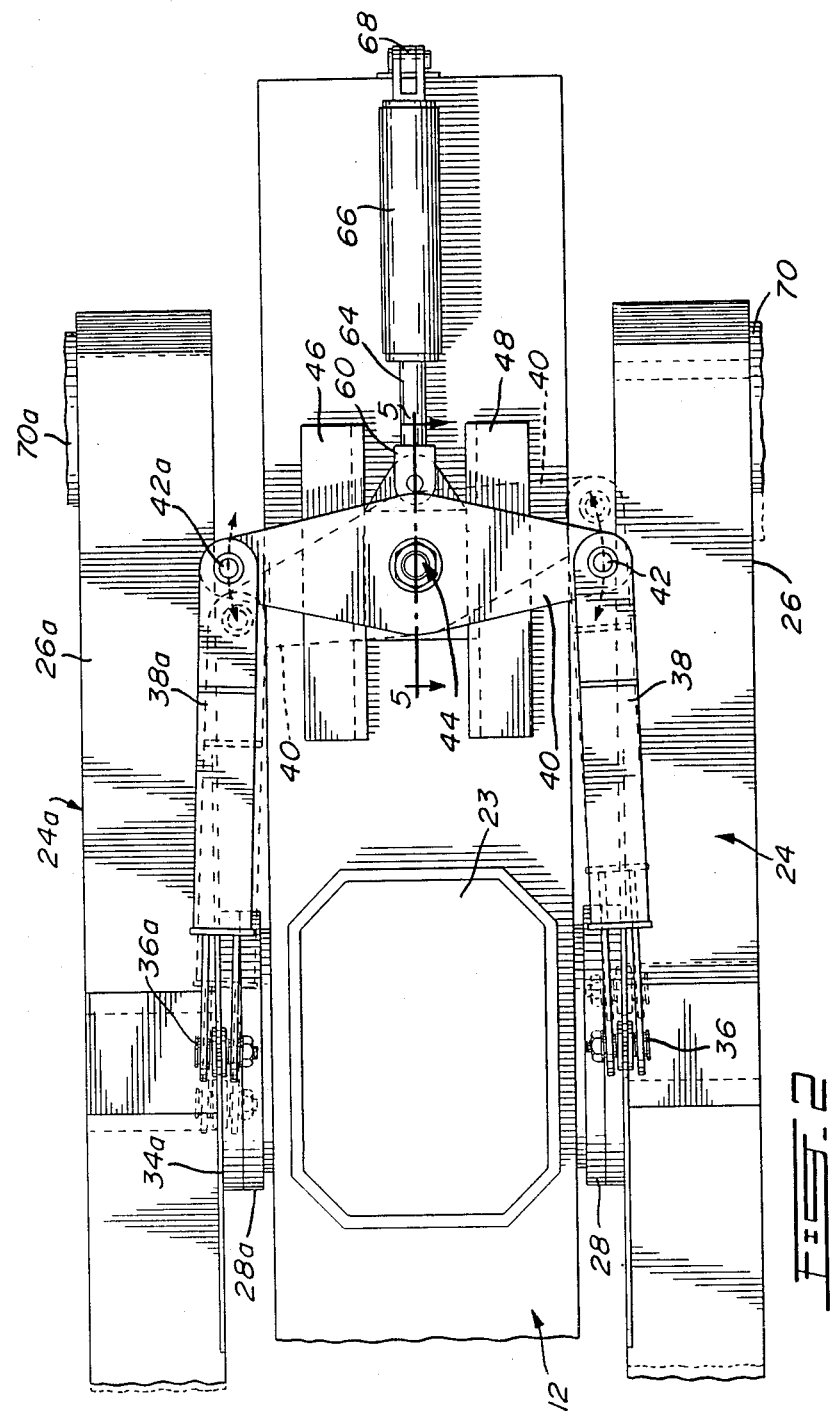

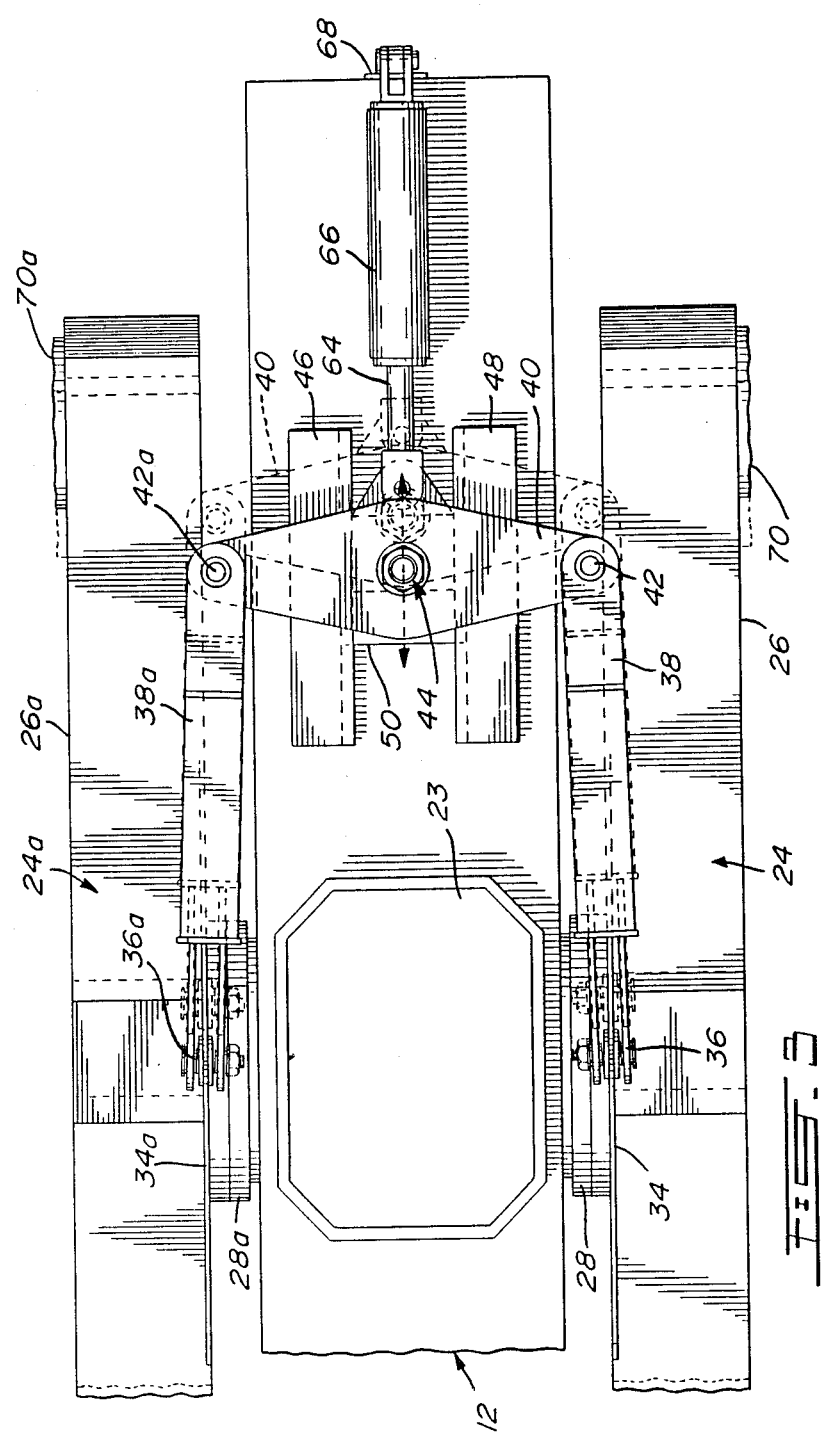

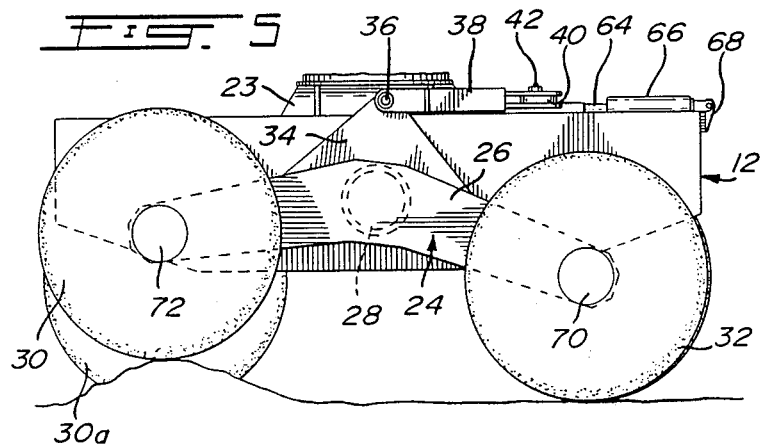
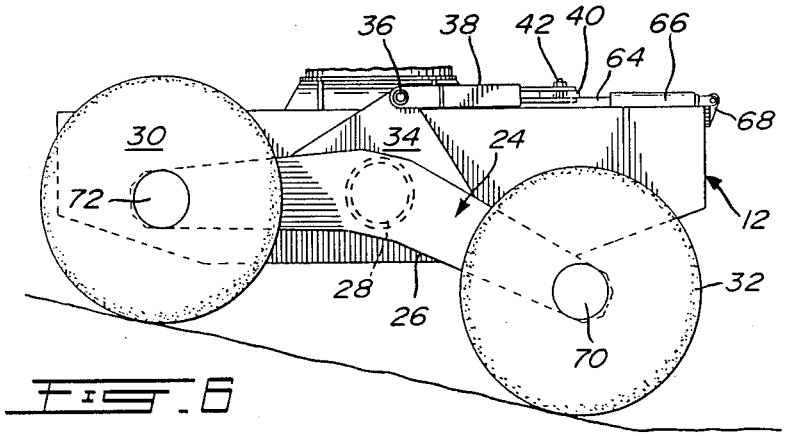
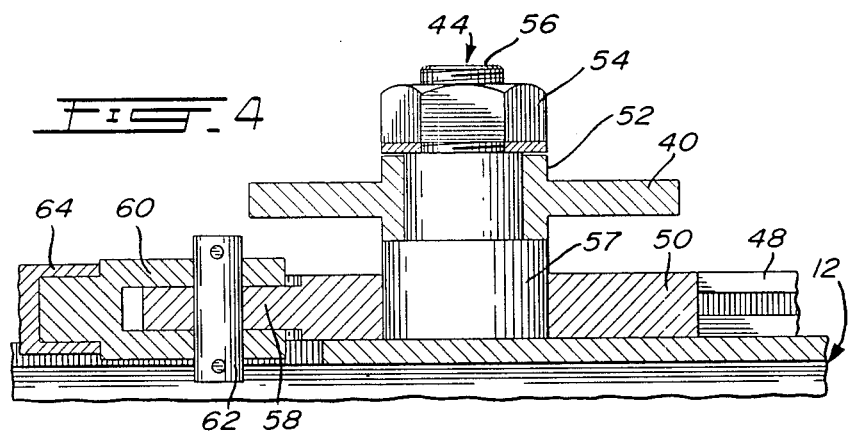

SELF-PROPELLED VEHICLE HAVING BOGIE-TYPE RUNNING GEAR

BACKGROUND OF THE INVENTION

1. Field of the Invention

The present invention relates to an improved suspension for a vehicle, and more particularly, to a self-propelled vehicle having bogie-type running gear.

2. Description of the Prior Art

The present invention relates to Canadian patent application No. 539,382, filed June 10, 1987, naming Jean-Marie Côté as inventor, and having a common applicant with the present application. This earlier filed application describes a bogie-type, self-propelled vehicle having a chassis with a bogie on each side of the chassis. The vehicle has a hydraulic system that includes actuator means connected between each bogie and the chassis for maintaining the chassis generally level on level ground. The hydraulic system includes first and second connecting systems extending between the two actuator means in a manner to have movement of one wheel in one bogie in one direction tend to cause movement of the corresponding wheel in the other bogie in the opposite vertical direction to the one direction to minimize tilting of the chassis. The improved suspension system also includes a second hydraulic system that can be selectively connected to one of the first and second connecting systems to tilt the chassis relative to the bogies in one direction or the other so as to generally maintain the chassis level on ground that slopes in the longitudinal direction of the vehicle.

It has been contemplated and, in fact, application No. 539,382 is an improvement over earlier mechanically linked bogie systems such as described in U.S. Pat. Nos. 3,313,555, issued Apr. 11, 1967, and 3,504,928, issued Apr. 7, 1970, to W. E. Reimer. In those patents, a bogie including a walking beam with a wheel at each end is centrally pivoted to each end of an axle extending transversely at the longitudinal center of the vehicle. A transverse rocking bar is pivoted to the front of the vehicle and to each end of the walking beams. In this manner, vertical displacement of any wheel causes an opposite vertical displacement of the corresponding wheel on the other side of the vehicle, ensuring four-point engagement of the wheels over any off-road terrain. Such advantages are also well known from U.S. Pat. No. 4,324,304 relative to a track or crawler-type vehicle. This last-named patent issued Apr. 13, 1982 to H. Hashimoto et al and is assigned to Mitsubishi Jukogyo K.K.

It has been found that the location of the rocking beam or bar in the Reimer patents as well as in the Mitsubishi patent is not suitable to off-the-road vehicles of the type used in forestry operations. The terrain in such operations is usually riddled with stumps and boulders, broken tree trunks and branches. It is important to design the underside of the chassis with a minimum of obstructions and to avoid locating any mechanical linkages or other elements which might be damaged or otherwise impede the movement of the vehicle over such rough terrain. However, the rocking beam or bar described in the prior art is located between the walking beams and thus in the lower part of the chassis where it creates an obstruction.

SUMMARY OF THE INVENTION

It is an aim of the present invention to provide a bogie-type, self-propelled vehicle having a mechanical linkage connecting the walking beams of the respective bogies with the linkage located unobstrusively on the vehicle.

It is a further aim of the present invention to provide an adjustable suspension to enable the chassis to remain relatively level while stationary or traveling on sloping terrain, particularly on the side of a relatively steep hill.

It is an aim of the present invention to provide a mechanical alternative to the hydraulic suspension system described and thus provide a simpler and more easily maintainable linkage than the hydraulic system.

In a construction in accordance with the present invention, there is provided a self-propelled vehicle having a single chassis, bogie means mounted on each side of the chassis including a pair of parallel walking beams, one on either side of the chassis and each pivotally mounted to shaft means on the chassis having a common transverse axis. Wheel means are rotatably mounted at each end of the walking beams. A first arm is fixedly mounted to each walking beam and extends upwardly from the walking beam. A rocking beam is pivotally mounted, about a vertical axis, to the chassis. Link means connects each first arm to a respective end of the rocking beam such that vertical displacement of a wheel means results in an opposite displacement of a corresponding wheel means on the other walking beam.

In a more specific embodiment of the present invention, the rocking beam is mounted to the chassis by way of a mounting pad to which the vertical pivot of the rocking beam is connected, and the mounting pad is displaceable in the longitudinal axis of the chassis. Motor means are provided for providing limited reciprocating movement to the mounting pad in the longitudinal axis.

As can be seen from the above, a simple mechanical linkage is provided connecting one bogie to the other. The linkage passes over the chassis, thus leaving the underbody clear, and the linkage is made to avoid the turntable.

By providing limited reciprocating longitudinal displacement to the rocking beam, the bogies can be set at any desired attitude to allow for a relatively level chassis when climbing slopes, etc.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a side elevation of a self-propelled vehicle mounting a knuckle boom grapple and in the form of a forwarder;

FIG. 2 is a top plan view of the carrier showing part of the undercarriage and with the superstructure of the vehicle removed;

FIG. 3 is a top plan view, similar to FIG. 2, showing details of the invention in a different operative position;

FIG. 4 is a fragmentary vertical cross-section taken along line 4—4 of FIG. 2;

FIG. 5 is a schematic view in side elevation showing the carrier portion or undercarriage of the vehicle in an operative position; and FIG. 6 is a side elevation, similar to FIG. 5, showing the carrier in a different operative position.

DESCRIPTION OF THE PREFERRED EMBODIMENTS

Referring now to FIGS. 1 to 3, there is shown an off-road vehicle 10, including a chassis 12 with bogies 24 and 24a on either side thereof. A frame 23 is mounted on the chassis 12 to which is mounted on a turntable 22. Any number of operating devices can be placed on the turntable as the carrier or understructure portion of the vehicle 10 would be common to a number of operative units. For instance, in the forestry industry, the carrier could mount a cab and deck in the form of a forwarder, and it could also include a grapple, such as shown in the drawings. The basic carrier could also be used for a feller-buncher or a skidder.

Bogies 24 and 24a are identical, and only one bogie will be described, while corresponding elements on the other bogie will be raised by the subscript a. Bogie 24 includes a walking beam 26 which is journaled on shaft 28 extending transversely of the chassis 12. A wheel 30, mounted on shaft 72, is mounted on the end of the walking beam 26, while the wheel 32 on shaft 70 is mounted on the other end of the walking beam. The walking beam also includes an arm 34 extending upwardly to a level just above the deck of the chassis 12. Thus, the walking beam 26 mounting wheels 30 and 32 can pivot around the shaft 28.

However, arm 34 is pivotally connected to link 38, as shown in FIG. 3, at pivot pin 36. The other end of link 38 is pivotally connected to a rocking beam 40. The end of the rocking beam 40 mounts a pivot pin 42 to which the link 38 is connected. Thus, link 38 and 38a are connected to each end of the rocking beam 40, which in turn is pivotally mounted to a spindle 56 at pivot 44, as shown in FIG. 4.

The axis of the pivot 44 is vertical. Thus, any vertical displacement of wheels 30 or 32 causes rocking of the walking beam 26 about the shaft 28 which in turn is transmitted through arm 34 and links 38 to the rocking beam 40. Any action of one end of the rocking beam 40 is transmitted mechanically to the other walking beam 26a by means of the rocking beam 40, the link 38a, and arm 34a.

The advantages of this arrangement are well described in copending application 539,382. In summary, and referring to FIG. 5, if the wheel 30 should pass over a bump, the clockwise rotation of the walking beam 26 will result in a counterclockwise rotation of walking beam 26a, causing wheel 30a to have an equal opposite vertical displacement downwardly. This action through the linkages causes the wheels always to be in four-point contact with the ground as well as to dampen the tipping action or movement of the center of gravity of the chassis. For example, if the vertical displacement of the wheel 30 should be 30 cm., the vertical downward displacement of wheel 30a will also be 30 cm., resulting in a vertical upward displacement of 15 cm. at the front of the chassis 12 at the center line thereof, and only 7.5 cm. at the center of the chassis 12.

A further feature is illustrated in the present drawings as shown in FIG. 3, that is, the capability of moving the rocking beam 40 longitudinally of the chassis. Thus, as shown in FIG. 4, the pivot 44, including spindle 56 and sleeve 57, are mounted on a sliding pad 50 which is limited to longitudinal sliding movement by means of blocks 46 and 48 which provide a track for the sliding pad 50. A hitch 58 is provided at one end of the pad 50 to which is connected a clamp 60 at one end of piston 64 cooperating with hydraulic cylinder 66. The other end of the hydraulic cylinder 66 is connected to bracket 68 on the chassis 12.

Thus, if it is necessary to climb or to operate on a slope, it is merely necessary to align the longitudinal axis of the chassis in the direction of the slope and to move the sliding pad 50, thereby moving the axis of the rocking beam 40. A displacement of the pivot 44 of the rocking beam 40 rearwardly of the chassis 12 will cause the bogies 24 and 24a to assume the angle illustrated, for instance, in FIG. 6, thereby leveling the chassis 12.

I claim:

1. A self-propelled vehicle having a single chassis, bogie means mounted on each side of the chassis including a pair of parallel walking beams, one on either side of the chassis and each pivotally mounted to shaft means on the chassis having a common transverse axis, wheel means rotatably mounted at each end of the walking beams, a first arm fixedly mounted to each walking beam and extending upwardly from the walking beam, a rocking beam pivotally mounted about a vertical axis to the chassis, link means connecting each first arm to a respective end of the rocking beam such that vertical displacement of a wheel means results in an opposite displacement of a corresponding wheel means on the other walking beam.

2. A self-propelled vehicle as defined in claim 1, wherein the wheel means on each end of the each walking beam is a pneumatic wheel, and the first arm includes an axis passing through the transverse axis of the shaft means on which the walking beam is mounted, and said first arm extends upwardly and mounts a pivot at a position above the chassis, and said rocking beam is mounted in a horizontal plane for pivoting movement about a vertical axis on the top of the chassis, and link means extend between the ends of the rocking beam and the respective first arms.

3. A self-propelled vehicle as defined in claims 1 and 2, wherein the rocking beam is mounted to the chassis by way of a sliding mounting pad to which the vertical pivot of the rocking arm is connected, and the sliding mounting pad is displaceable in the longitudinal axis of the chassis, and motor means are provided for effecting limited reciprocating movement to the mounting pad in the longitudinal axis, whereby the attitude of the bogies can be changed on adjusting the relative longitudinal position of the mounting pad by means of the motor means.

4. A self-propelled vehicle as defined in claim 1, wherein the vehicle serves as a forwarder.

5. A self-propelled vehicle as defined in claim 1, wherein the vehicle serves as a carrier for a feller-buncher.

6. A self-propelled vehicle as defined in claim 1, wherein the vehicle serves as a carrier for a skidder.

* * * * *